(12) United States Patent
Kan

(10) Patent No.: US 9,934,151 B2
(45) Date of Patent: Apr. 3, 2018

(54) SYSTEM AND METHOD FOR DYNAMIC OPTIMIZATION FOR BURST AND SUSTAINED PERFORMANCE IN SOLID STATE DRIVES

(71) Applicant: Dell Products, LP, Round Rock, TX (US)

(72) Inventor: Lip Vui Kan, Hillbrooks (SG)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/195,396

(22) Filed: Jun. 28, 2016

(65) Prior Publication Data

US 2017/0371794 A1    Dec. 28, 2017

(51) Int. Cl.
G06F 12/08        (2016.01)
G06F 12/0871      (2016.01)
G06F 12/02        (2006.01)
G06F 3/06         (2006.01)

(52) U.S. Cl.
CPC ........ G06F 12/0871 (2013.01); G06F 3/0608 (2013.01); G06F 3/0631 (2013.01); G06F 3/0634 (2013.01); G06F 3/0652 (2013.01); G06F 3/0653 (2013.01); G06F 3/0658 (2013.01); G06F 3/0679 (2013.01); G06F 12/0246 (2013.01); G06F 12/0253 (2013.01); G06F 2212/1044 (2013.01); G06F 2212/214 (2013.01); G06F 2212/222 (2013.01); G06F 2212/281 (2013.01); G06F 2212/313 (2013.01); G06F 2212/6012 (2013.01); G06F 2212/7205 (2013.01)

(58) Field of Classification Search
CPC ............. G06F 12/0871; G06F 12/0246; G06F 12/0253; G06F 3/0608; G06F 3/0631; G06F 3/0634; G06F 3/0652; G06F 3/0653; G06F 3/0658; G06F 3/0679
USPC ........................ 711/103, 154, 156, 158, 170; 365/185.33; 707/813, 814
See application file for complete search history.

(56) References Cited

U.S. PATENT DOCUMENTS

| | | | |
|---|---|---|---|
| 5,745,673 A | 4/1998 | Di Zenzo et al. | |
| 8,280,866 B2 * | 10/2012 | Ylonen | G06F 9/522 707/695 |
| 8,527,544 B1 | 9/2013 | Colgrove et al. | |
| 9,047,178 B2 * | 6/2015 | Talagala | G06F 12/0246 |
| 9,218,134 B2 * | 12/2015 | Amit | G06F 3/064 |
| 9,400,603 B2 * | 7/2016 | Tressler | G06F 3/0604 |
| 9,524,121 B2 * | 12/2016 | Maeda | G06F 3/0646 |
| 2008/0082736 A1 | 4/2008 | Chow et al. | |
| 2009/0172258 A1 | 7/2009 | Olbrich et al. | |
| 2010/0057976 A1 | 3/2010 | Lasser | |
| 2011/0264712 A1 * | 10/2011 | Ylonen | G06F 12/0261 707/818 |

(Continued)

Primary Examiner — Stephen Elmore
(74) Attorney, Agent, or Firm — Prol Intellectual Property Law, PLLC; H. Kenneth Prol

(57) ABSTRACT

A method and information handling system configured to executing instructions of an SSD dynamic optimization buffer switching system and configured to detecting SSD storage capacity utilization via an SSD controller. The method and information handling system further configured to reallocate buffer capacity from write acceleration buffer capacity to garbage collection buffer capacity to increase buffer availability for garbage collection when SSD storage capacity utilization exceeds a threshold level.

20 Claims, 8 Drawing Sheets

(56) References Cited

U.S. PATENT DOCUMENTS

| | | | |
|---|---|---|---|
| 2011/0264870 A1* | 10/2011 | Ylonen | G06F 12/0261 |
| | | | 711/154 |
| 2012/0072652 A1 | 3/2012 | Celis et al. | |
| 2012/0198129 A1 | 8/2012 | Van Aken et al. | |
| 2014/0101379 A1 | 4/2014 | Tomlin | |
| 2014/0195725 A1 | 7/2014 | Bennett | |
| 2015/0012693 A1* | 1/2015 | Amit | G06F 3/064 |
| | | | 711/104 |
| 2015/0234612 A1* | 8/2015 | Himelstein | G06F 3/0619 |
| | | | 714/6.21 |
| 2016/0062829 A1* | 3/2016 | Harasawa | H03M 13/2906 |
| | | | 714/755 |
| 2016/0117104 A1* | 4/2016 | Hashimoto | G06F 12/0246 |
| | | | 711/171 |
| 2016/0162208 A1 | 6/2016 | Cai et al. | |
| 2016/0352832 A1* | 12/2016 | Li | H04L 1/1867 |
| 2017/0168929 A1* | 6/2017 | Kanno | G06F 12/0246 |
| 2017/0168951 A1* | 6/2017 | Kanno | G06F 12/1009 |

\* cited by examiner

SYSTEM AND METHOD FOR DYNAMIC OPTIMIZATION FOR BURST AND SUSTAINED PERFORMANCE IN SOLID STATE DRIVES

FIELD OF THE DISCLOSURE

The present disclosure generally relates to information handling systems, and more particularly relates to management of operation for solid state drives (SSD) used with information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. In particular, one or more disk drives may include solid state drives such as NAND-based flash drives, NOR-based flash drives, DRAM based flash drive or similar variation as understood in the art. The information handling system may also include one or more buses operable to transmit communications between the various hardware components.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The performance of solid state drives (SSD) used with information handling systems (IHS) can vary over time. Some performance variation may occur with respect to rates of writing data or programming into non-volatile memory of SSD, as well as reading data. Several strategies may be used with SSD to improve performance as well as maximize utilization of the blocks of SSD memory. SSD memory may be a NAND or NOR non-volatile memory type in various embodiments. It is understood that some of the concepts disclosed herein may be applied to either NAND or NOR or variations of these types of non-volatile memory. For purposes of illustration, embodiments herein are described for NAND solid state drives but may variously be applied to other types of non-volatile memory by those of skill in the art.

In the present disclosure, various embodiments are described for an SSD dynamic optimization buffer switching system to permit reallocation of reserved SSD buffer space for garbage collection or write acceleration functions depending on the state of operation of the SSD drive. In one aspect, buffer allocation or deallocation may depend on user space capacity occupied or available. In another aspect, buffer allocation or deallocation may depend on how many buffer switch actions have occurred. Switching SSD buffer space spare capacity between cell architecture that may be single level cell (SLC) to a triple-level cell (TLC) may be damaging or cause wear to flash cells over time. Therefore, switching conditions such as frequency or overall amount of switching between cell architectures may influence allocation of spare buffer area. Algorithms for conducting the SSD dynamic optimization buffer switching are described in various embodiments herein.

Figure 1:
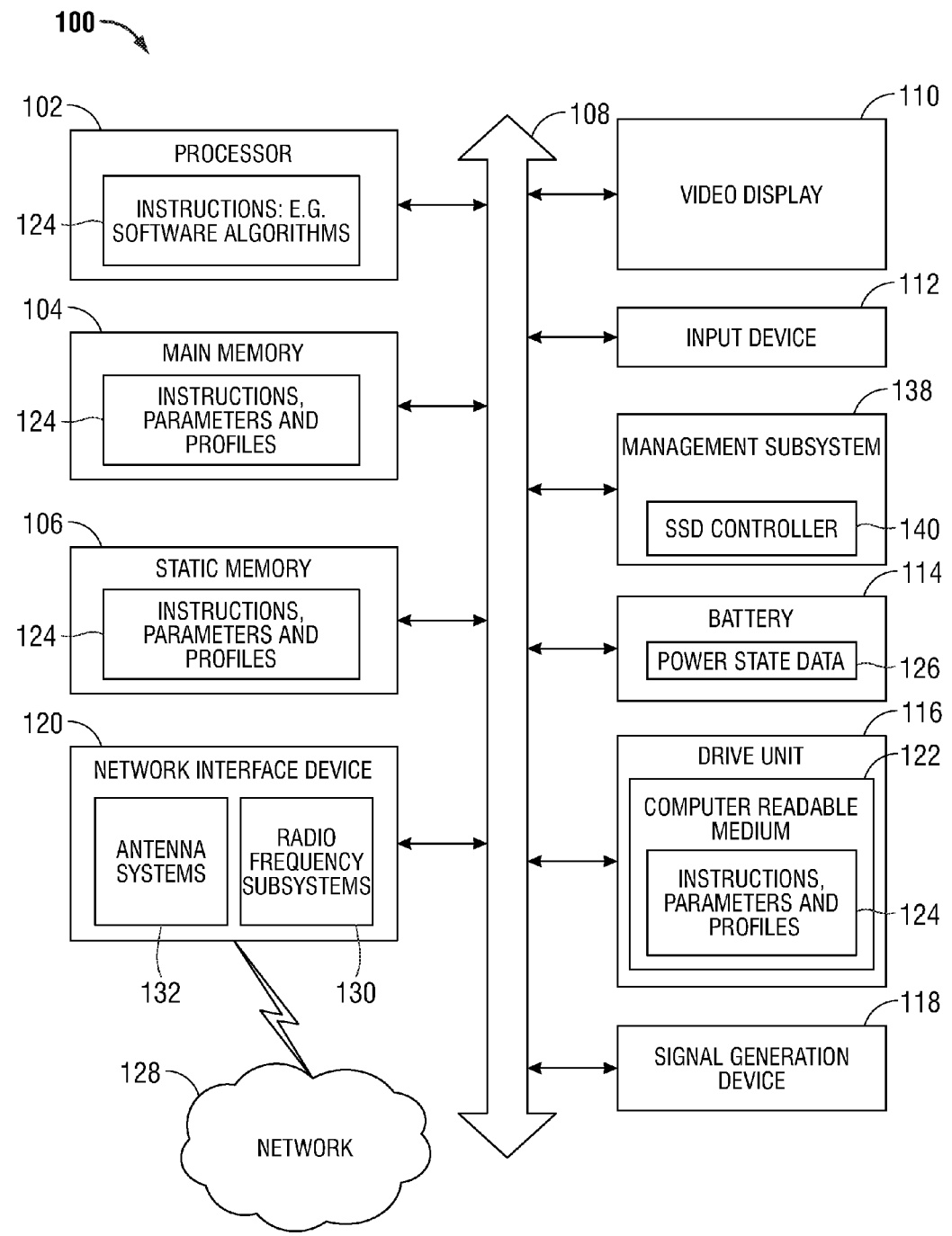
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 shows an information handling system 100 capable of administering each of the specific embodiments of the present disclosure. The information handling system 100 can represent the client information handling systems such tablet computer, laptop computers, smartphone systems, other mobile computing devices, servers or systems such as located anywhere within a network, including a remote data center operating virtual machine applications. The information handling system 100 may also execute code 124 for instructions and algorithms such as an operating system and applications that may operate on servers or systems, remote data centers, or on-box in individual client information handling systems such as according to various embodiments herein.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof). Static memory 106 or drive unit 116 or both may include various types of solid state memory as understood in the art. This may include NAND flash or NOR flash memory types or some combination of both used with the solid state drive (SSD) systems and static memory systems described in embodiments herein. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device, such as a mouse, touchpad, or gesture or touch screen input. The information handling system 100 can also include a signal generation device 118, such as a speaker or remote control. The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 116, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive 116 or in a storage system (not illustrated) associated with network channel 120 or any combination thereof. Application programs 124 and BIOS/FW code 124 can each be implemented as single programs, or as separate programs carrying out the various features as described herein. Application program interfaces (APIs) such Win 32 API may enable application programs 124 to interact or integrate operations with one another.

Main memory 104 may contain computer-readable medium (not shown), such as RAM in an example embodiment. Static memory 106 may contain computer-readable medium (not shown), such as NOR or NAND flash memory in some example embodiments. The disk drive unit 116 may include a computer-readable medium 122 such as a magnetic disk in an example embodiment. The computer-readable medium of the memory and storage devices 104, 106, and 116 may store one or more sets of instructions 124 such as software code corresponding to the present disclosure.

The information handling system may also have a management subsystem 138 with a plurality of information handling system subsystems for control of a plurality of systems. For example, management subsystem 138 may interface with a variety of controllers to execute policy or enable operation of various information handling subsystems. In an example embodiment, an SSD controller 140 may access other elements such as drive unit 140 or static memory 106 shown in FIG. 1, for example, via one or more buses 108. In some aspects, system-level operation or component-level operation can be managed via the management subsystem 138.

Static memory 106 or drive unit 116 may also be managed by a management subsystem 138 that may operate one or more controllers including an SSD controller 140 in an example embodiment. The SSD controller 140 may contain or access code instructions in firmware, software, or may be hard coded to execute instructions to perform any one or more of the methods or computer based functions disclosed herein. For example, information handling system 100 includes one or more sets of firmware code instructions used with the SSD controller to operate the SSD dynamic optimization buffer switching system and various aspects of solid state drive operation including addressing, program and read operations, invalidation, buffer type switching, garbage collection, write acceleration, wear balancing, a buffer switch counter, among other functions associated with operation of flash memory or a flash drive.

The information handling system may include a power source such as battery 114 or an A/C power source. Battery 114 may include a smart battery system that tracks and provides power state data 126.

The information handling system 100 can also include a network interface device 120 that may be wired network adapter or may be a wireless adapter as shown. Wireless network interface devices will include antenna subsystems 132 and radio frequency control subsystems 130 which may work in connection with the management subsystem 138. As a wireless adapter, network interface device 120 can provide connectivity to a network 128. A wired network interface is also contemplated (not shown). Radio frequency subsystems 130 and antenna subsystems 132 may include transmitter/receiver circuitry, wireless controller circuitry, amplifiers and other circuitry for wireless communications. Each radiofrequency subsystem 130 may communicate with one or more wireless technology protocols.

In some embodiments, dedicated hardware implementations such as application specific integrated circuits, programmable logic arrays and other hardware devices can be constructed to operate as SSD controllers to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware executed by one or more controllers or by software programs executable by a computer system. Further, in an exemplary, non-limited embodiment, implementations can include distributed processing, component/object distributed processing, and parallel processing.

Figure 2:
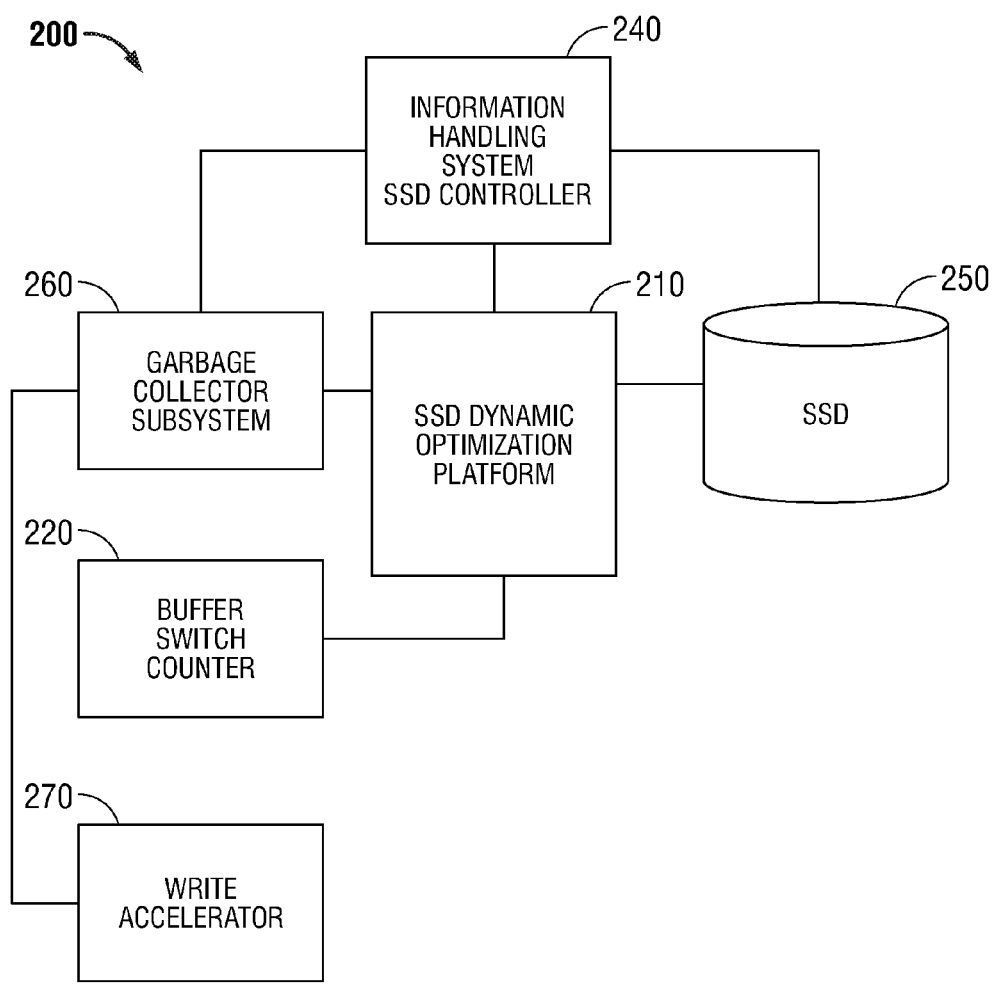
FIG. 2 is a block diagram illustrating components for an aspect of an SSD dynamic optimization buffer switching system according to an embodiment of the present disclosure.

FIG. 2 is a block diagram illustrating components for an aspect of the SSD dynamic optimization buffer switching system 210 and various aspects of solid state drive operation including addressing, program and read operations, invalidation, buffer type switching, garbage collection 250, write acceleration 270, wear balancing, a buffer switch counter 220, among other functions associated with operation of flash memory or a flash drive according to an embodiment of the present disclosure. The information handling system SSD controller 240 of FIG. 2 may execute firmware code to operate an SSD dynamic optimization buffer switching system platform 210. The SSD dynamic optimization buffer switching system 210 coordinates determination of flash user space capacity and enables dynamic optimization through buffer switching and reallocation for functions such as garbage collection and write acceleration depending on conditions. SSD controller 240 is operatively coupled to an SSD device 250 or static memory.

The SSD dynamic optimization buffer switching system 210 may operate to reallocate spare area of the SSD flash memory 250 from one purpose to another depending on occupancy of data blocks of the SSD flash. This reallocation may further require a switching of the buffer capacity of flash cells from an SLC cell structure to a TLC cell structure having a triple bit per cell structure. The SSD dynamic optimization buffer switching system 210 has a buffer switch counter 220 to record each switching occurrence for of the cell structure in the spare area used for flash buffering. Switching between cell structure types may wear out or cause damage to cells within the buffering area after several occurrences. Experience with SSD systems will enable a manufacturer to predict how many switching occurrences increase a damage or failure risk to an unacceptable level. Recording the cell structure switching activity allows the SSD dynamic optimization buffer switching system 210 to determine at what point a reduction or prohibition of cell structure switching may be necessary due to reliability concerns.

The SSD controller 240 may conduct numerous functions to enable operation of a solid state drive 250 as understood by those of skill in the art. Some example SSD function includes establishing block addressing structure, executing program or read functions, executing address invalidation functions, executing wear-leveling activity, maintaining memory occupancy mapping, executing error correction code, and other solid state drive activity. A flash drive 250 may also be required to store firmware, map defective cells or blocks, and maintain an FTL table for mapping between logical addressing and physical logical block addressing of flash memory systems.

In some embodiments, the SSD controller 240 via firmware, software, or hard coding may also conduct garbage collection with garbage collector system 260. As a solid state memory is used, blocks get filled up with invalid data. When data is modified by a read and rewrite of the data to a new flash location, old data that was modified in flash is marked invalid. However a block of flash cells may still contain some data that is valid. Over time and usage, the SSD user area becomes littered with pockets of invalid cells within the blocks and this can begin to degrade performance with fewer and fewer available block addresses for new write operations.

The performance degradation happens due to the characteristics of NAND and how the non-volatile memory is organized. Each block consists of multiple pages. The smallest write unit is the page, but the smallest erase unit is the block. Therefore, when a piece of data is to be modified, the original location in which it is stored in is marked as invalid, and the modified value is written into another page. However some data in a block may still be valid as described. The invalidated data is generically termed garbage in the industry. Over time, a large amount of garbage builds up, and the invalid-marked data are sparsely distributed over the memory map of the SSD. Valid data needs to be aggregated and re-written into new locations in order for blocks to be erased and hence reclaimed for valid data. This process is known as garbage collection 260. Garbage collection 260 may improve performance by freeing up blocks for program write operations with new valid data.

Firmware code may be executed by the SSD controller 240 to execute an algorithm for the garbage collector subsystem 260. Several garbage collection algorithms are known in the art and may be used with the present disclosure. Garbage collection 260 may require transfer of remaining valid data into a buffer location and then a rewrite to a new location in the user area. Thus the garbage collector 260 may require resources of the read and program functions as well as portion of a spare area of buffering. With buffering for a garbage collector 260, greater available buffer capacity is helpful in addition to the speed of program or read operations. Thus, for garbage collection operation, an TLC structure may provide greater buffer capacity than the same number of cells used with an SLC structure. With either a bursty or sustained activity use of an SSD 250 by an information handling system, this can create various challenges depending on the structure of the buffer flash cells and what the current usage is as described further below.

In another embodiment, an SSD controller 240 may implement a set of instructions for an algorithmic write accelerator 270. Write Acceleration 270 is a concept in which write performance in SSD can be improved by using unused capacity, such as spare capacity reserved for buffers and other uses, as a single level cell (SLC) NAND flash buffer, where data can be written into non-volatile memory at a higher rate compared to triple-level cell (TLC) NAND flash. Similarly, a single level flash buffer cell (SLC) is faster than multiple-level cell (MLC) NAND flash having 2 bits per cell. However, write acceleration 270 begins to lose efficiency. Write performance of the overall SSD degrades as the SSD capacity available in unused data blocks is gradually filled up with user data over time.

The performance degradation as described above happens because as capacity utilization goes up, the SSD controller 240 will have to kick in garbage collection in order to claim free blocks for data writing. A bottleneck hence is no longer on how quickly data can be written into non-volatile memory, but how quickly free blocks are made available by the garbage collection process 260.

SSD 250 is optimized for either burst or sustained performance. Certain information handling systems such as laptop computer systems may have a user profile that is bursty in nature, and Write Acceleration 270 would help to deliver better data throughput performance in this category, but performance degrades as SSD capacity is filled with user data. The user profile of other information handling systems such as those used as workstations on the other hand, is more sustained in nature. Nonetheless, as SSD memory storage capacity is filled, performance degrades. An algorithm is disclosed to reallocate the buffer used for write acceleration 270 to the garbage collector 260 in order to sustain the write performance as capacity utilization goes up.

In the present disclosure, an SSD dynamic optimization buffer switching system 210 is established to monitor SSD performance data including SSD storage capacity utilization. The SSD storage capacity utilization may be detected by an SSD controller 240 for use by the SSD dynamic optimization buffer switching system 210. The SSD dynamic optimization buffer switching system 210 may be one or more sets of firmware or software code instructions operating via the SSD controller 240 or one or more controllers in an information handling system. In some embodiments, some or all of the SSD dynamic optimization buffer switching system 210 may be firmware operating via BIOS or executing code via one or more application processors. The SSD dynamic optimization buffer switching system 210 may coordinate via the SSD controller 240 with code instructions for operation of the SSD flash memory organization and mapping, flash translation layer (FTL), wear-leveling, error correction code, and operations such as Write Acceleration 270 and garbage collection 260 among other functions relating to operation or enhancing operation of an SSD flash memory 250. In some embodiments where portions of the SSD dynamic optimization buffer switching system 210 are code instructions in software operating on an application processor, an API may be used to integrate these functions with those coded with the SSD controller 240.

The SSD dynamic optimization buffer switching system 210 may operate to reallocate spare NAND flash memory area reserved for buffering depending on conditions of memory storage utilization levels and switching levels experienced with the SSD flash memory 250. The SSD dynamic optimization buffer switching system 210 may switch the type of address mapping for cell structure used in the reserved spare buffer area between SLC NAND and TLC NAND depending on the SSD flash conditions present. The reallocation may provide some amount of additional buffering for garbage collection 260 when storage utilization is high and freed blocks are needed for additional storage. Further, the SSD dynamic optimization buffer switching system 210 may track how often reallocation and switching of the buffer area takes place due to damage or degradation of those non-volatile cells that may occur due to regular switching or reallocation. The frequency or count of reallocation and buffer switching may be tracked via buffer switch counter 220 operating on the SSD controller 240. In yet another embodiment, after garbage collection 260 frees up storage memory for future utilization, spare buffer areas may be reallocated back to Write Acceleration 270 such that speed of writes or programming may be again enhanced. Reallocation back to Write Acceleration may occur depending on SSD flash conditions after garbage collection.

Figure 3A:
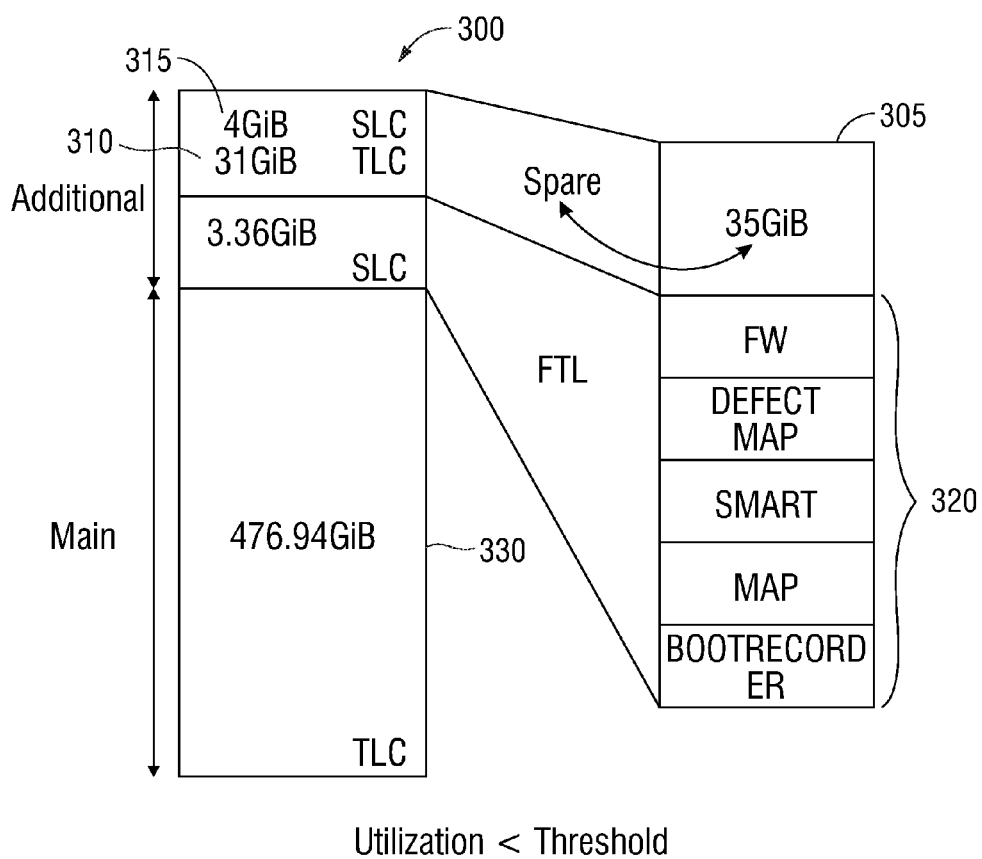
FIG. 3A is a graphic block diagram illustrating aspect of an SSD memory before buffer switching according to an embodiment of the present disclosure.
Figure 3B:
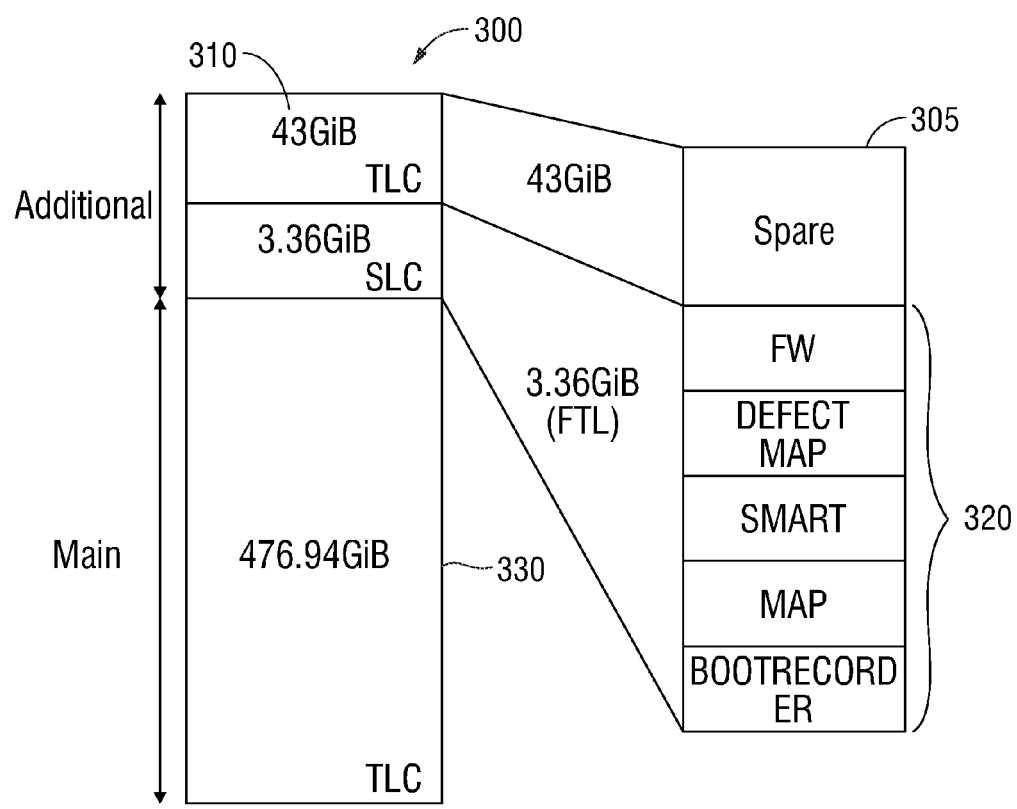
FIG. 3B is a graphic block diagram illustrating aspect of an SSD memory after buffer switching according to an embodiment of the present disclosure.

FIGS. 3A and 3B show memory allocation diagrams for NAND flash memory according to embodiments of the present invention. FIG. 3A shows memory allocation by an SSD controller for spare area 305, FTL 320, and user area (main) 330 of an SSD NAND flash memory 300 according to an embodiment of the present invention. Spare buffer area 305 has 31 GiB allocated to garbage collection 310. In an embodiment, the garbage collection allocated area utilizes a TLC format to achieve additional memory buffer space. Additionally, in the example embodiment, the spare buffer area 305 also has allocated 4 GiB of fast programming SLC formatted buffer for use in assisting performance via a Write Acceleration buffer 315. The Write Acceleration buffer 315 uses a fast-programming SLC format in the present embodiment to enhance SSD write performance. Additionally shown in FIG. 3A is a portion of additional area, termed the FTL area 320, allocated for other purposes such as flash translation layer (FTL) for conversion between the logical addressing from the host and the physical SSD addressing. This additional area, the FTL area 320, may have additional storage purposes including storage of a memory mapping, defect mapping, boot record errors, and for other purposes and is not limited to FTL translation purposes and redundant copies of such tables. In the example embodiment, the additional area including the FTL 320, is shown at 3.36 GiB of SLC formatted memory.

The allocation of memory areas depicted in FIG. 3A occur in some embodiments when user data utilization levels of used data blocks are still below a threshold level. In the example embodiment, the main user area 330 has a capacity of 476.94 GiB. When the main user area 330 utilization is below a threshold level, spare buffer area 305 may be partitioned between the Write Acceleration buffer area 315 and a garbage collection area 310 as shown. The partitioning may be made in any ratio and the size of the buffers allocated to each in the present example are for illustrative purposes only. It is understood that any amount of partitioning of the spare area 305 between Write Acceleration 315 and garbage collection 310 may be made. Write Acceleration allocates a portion of the spare area for use as SLC buffer 315, thereby effectively reducing the buffer size available to the garbage collector 310.

User capacity or the main user area of an SSD flash memory is defined by the International Disk Drive Equipment and Materials Association (IDEMA) logical block addressing (LBA) count in some embodiments. In such an example embodiment, the main user area 330 is typically about 7% less than the raw capacity available in the SSD. The spare capacity as described above can be used for data buffering. As noted in earlier, Write Acceleration helps to boost data throughput at low capacity utilization, but a larger buffer for the garbage collector delivers higher data throughput at high capacity utilization.

FIG. 3B illustrates a memory allocation diagram according to another embodiment. FIG. 3B shows memory allocation by an SSD controller for spare area 305, FTL area 320, and user area (main) 330 of an SSD NAND flash memory 300 according to another embodiment of the present invention. Spare buffer area 305 has 43 GiB allocated to garbage collection 310 in this example embodiment; an additional 12 GiB of TLC formatted buffering converted from the 4 GiB of SLC formatted buffering of FIG. 3A. The memory allocation depicted in FIG. 3B may arise under the present disclosure when SSD capacity utilization of used data blocks exceeds a threshold level in an example embodiment. In the embodiment, the garbage collection allocated area utilizes a TLC format to achieve additional memory buffer space. As capacity utilization hits 90% or some other threshold in an example embodiment, the SSD firmware disables Write Acceleration and deallocates the SLC buffer returning the reclaimed buffer to the garbage collector 310 as depicted. Accordingly, in the example embodiment, the spare buffer area 305 is not shown as no memory is allocated of fast programming SLC formatted buffer for use with Write Acceleration. It is understood, that in some embodiments, complete disabling of Write Acceleration may not occur but a Write Acceleration buffer 315 may instead be simply reduced in size and reallocated to garbage collection 315. Finally, as in FIG. 3A, a portion of additional area, termed the FTL area 320 is allocated for a flash translation layer (FTL) as well as for additional SSD purposes including storage of a memory mapping, defect mapping, boot record errors, and for other purposes and is not limited to FTL translation purposes and redundant copies of such tables.

Figure 4:
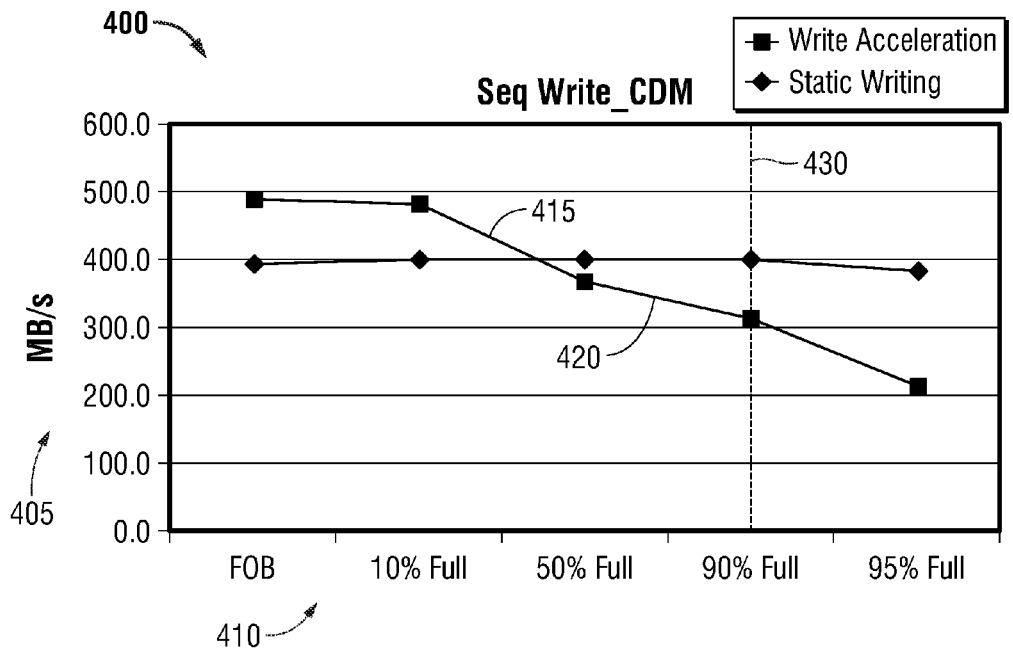
FIG. 4 is a graphical chart illustrating the SSD dynamic optimization buffer switching system on SSD write performance according to an embodiment of the present disclosure.

The garbage collector now has 43 GB in available buffer 310 in FIG. 3B compared to 31 GB at 310 in FIG. 3A, and this extra buffer capacity is put to good use to improve the efficiency of the garbage collection process. FIG. 4 below further describes the difference in performance benefit of write acceleration as main user memory area capacity fills up.

The chart in FIG. 4 illustrates the write performance of SSD systems executing Write Acceleration as compared to static writing operations not utilizing Write Acceleration. In FIG. 4, performance is measured in a performance metric of MB/s along axis 405. In an example embodiment, MB/s represents a SSD write throughput measure. Along axis 410, SSD storage capacity utilization is indicated. In an example embodiment, this capacity utilization may represent a percentage of SSD total available blocks. In other embodiments, capacity utilization ay represent a percentage of a user main area of the SSD that is filled. In one example embodiment, the SSD storage capacity utilization relates to drive capacity standardization of IDEMA LBA counts of user capacity.

Write Acceleration measurements are depicted at 415. Static writing is depicted at 420. As shown in the embodiment of FIG. 4, Write Acceleration increases write throughput over static writing throughput 420 when the used SSD capacity is new as delivered from the factory (FOB) or near 0%. When the SSD total available blocks are filled to about 50%, such as via sequential writes filling the main user capacity, it can be seen that the user write throughput speed falls to about the same or even below the speed of static writes. With greater usage capacity consumed in the main user area, write acceleration throughput actually falls below that of static writes. In the example embodiment, this data may be used to select an SSD storage capacity utilization threshold level of main user area capacity. SSD capacity being filled above the SSD storage capacity utilization threshold level causes Write Acceleration to be disabled or reduced and reallocation of the buffer area may be shifted to garbage collection. In the presently shown embodiment, the SSD storage capacity utilization threshold 430 is set at when 90% of SSD total available block capacity is filled. It is understood that any SSD storage capacity utilization threshold level may be selected. For example, in the embodiment of FIG. 4, a threshold may be selected at 95%, 75%, or even 50% or any percentage. However in some embodiments, the SSD storage capacity utilization threshold should be selected to improve the operation of the SSD according to the disclosed embodiments, while not incurring overly frequent buffer switching which may wear out or damage cells.

As additional buffering is dedicated to garbage collection under one or more embodiments, the fill percentage of the main user area capacity is reduced due to blocks being freed for valid data writes. Thus, in some embodiments herein, the buffer will be reallocated back to Write Acceleration as total SSD capacity is reduced below a second capacity threshold level. The second capacity threshold level may be the same SSD storage capacity utilization threshold above or it may be a different level in some embodiments.

Each de-allocation or reallocation incurs an additional buffer switch occurrence in some embodiments or the cycle back to the original buffer allocation levels may incur an additional buffer switch occurrence. To reduce over switching, an SSD storage capacity utilization threshold may be set to a higher level. In some embodiments, this SSD storage capacity utilization threshold may be set at 90%. By contrast, an SSD storage capacity utilization threshold at 50% or 55% fill capacity of a user main area, for example, may cause buffer switching too frequently in some embodiments. It is understood however that any SSD storage capacity utilization threshold level may be selected.

Figure 5:
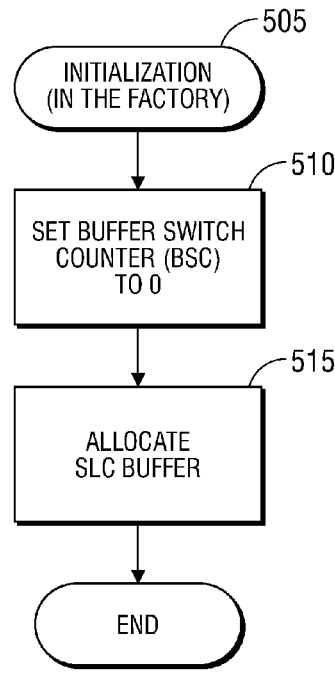
FIG. 5 is a flow diagram illustrating a method of initializing the SSD dynamic optimization buffer switching system according to an embodiment of the present disclosure.

FIG. 5 is a flow chart showing the SSD dynamic optimization buffer switching system as execution of code upon initialization. Flow begins at 505 where the initialization of the SSD and SSD controller occur and include establishing a memory mapping structure, initializing algorithms for wear balancing, garbage collection, write acceleration, error correction, write or read operations, bit per cell structure, and other SSD functions as appropriate. These initializations of code algorithms are prepared along with the SSD and SSD controller initialization in firmware or hard coded wiring in some embodiments. The steps of FIG. 5 may occur at the factory after manufacture of the SSD or after installation of the SSD in the information handling system with the SSD controller. The SSD and SSD controller are initialized when they are powered up with activation of a host information handling system in some embodiments.

Proceeding to 510, the SSD dynamic optimization buffer switching system sets a buffer switch counter to zero. The buffer switch counter is set to zero upon initialization because no buffer switching or switching of cell structure has occurred yet. This is done in preparation for execution with the SSD dynamic optimization buffer switching system algorithms according to various embodiments herein.

At 515, the SSD controller may allocate the buffer according to initial factory specifications. This may include allocating SLC buffer in the spare area of the SSD for Write Acceleration. In an example embodiment, allocation of the spare area may also be made for TLC buffering for garbage collection purposes. Other buffers may be allocated as is understood. In an example embodiment, the SLC buffer allocation may occur in accordance with the embodiment of FIG. 3A. As stated, other buffer allocation amounts between SLC buffering and TLC buffering may be made for several SSD operational processes including Write Acceleration, garbage collection, and other purposes as is understood. At this point, the process of FIG. 5 may end.

Figure 6:
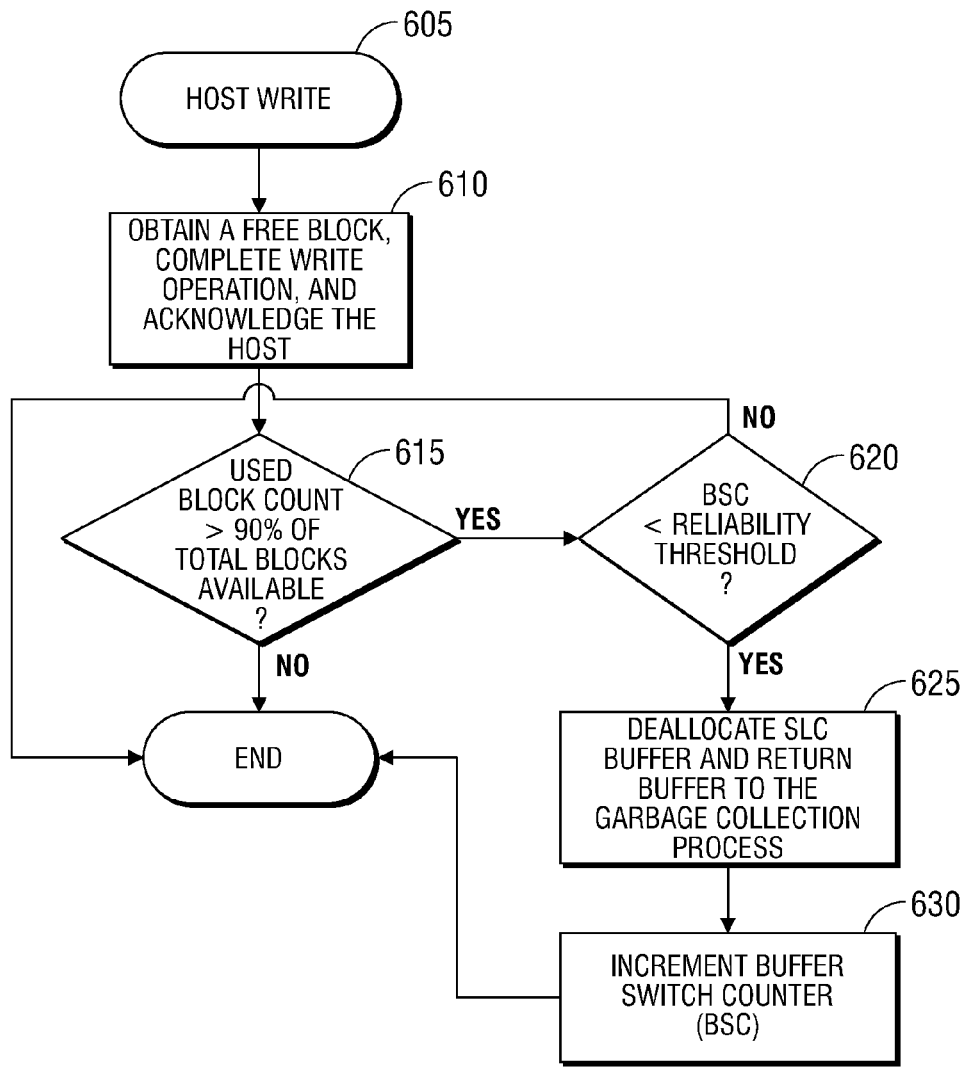
FIG. 6 is a flow diagram illustrating a method of operating the SSD dynamic optimization buffer switching system according to an embodiment of the present disclosure.

FIG. 6 is a flow chart showing operation of the SSD dynamic optimization buffer switching system according to one example embodiment. Flow begins at 605 where the a host initiates a write command to the SSD. The host write is received by the SSD controller. At 610, the SSD controller obtains a free block from the memory map. Then the SSD controller completes the write command to write data into the obtained block and indicate in the memory map that the cells in the obtained block are occupied. In some embodiments, the SSD controller acknowledges the write to the host.

Proceeding to block 615, the SSD dynamic optimization buffer switching system assesses the block count for the SSD memory. In one embodiment, the block count may be the SSD total available blocks for a flash drive. In other embodiments, the block count may be the IDEMA block count as understood by those of skill. The block count may be relative to the raw capacity of the SSD in an embodiment. In other embodiments, the block count may be relative to the SSD capacity available for the main user area. The block count is compared at 615 to an SSD storage capacity utilization threshold to determine if the block count exceeds the SSD storage capacity utilization threshold. In the example embodiment, the SSD storage capacity utilization threshold is 90% of the SSD total available block count, but it is understood that any percentage level may be used as described herein. For example, an SSD storage capacity utilization threshold may be set at 75% or at 95% depending on whether usage of the SSD by the host information handling system is a sustained or a bursty usage. If the block count of used SSD blocks does not exceed the SSD storage capacity utilization threshold, then the process may end. If the block count does exceed the SSD storage capacity utilization threshold, flow proceeds to block 620.

At block 620, the SSD dynamic optimization buffer switching system assesses the buffer switch counter to determine a value for the number of buffer switching occurrences. The SSD controller executes code of the SSD dynamic optimization buffer switching system to determine whether the buffer switch count exceeds a reliability buffer switching threshold count level. This reliability buffer switching threshold count is set to indicate to the SSD dynamic optimization buffer switching system when the number of buffer switching occurrences has reached a level where damage or wear to the SSD buffer cells may occur. In some embodiments, this may be a fixed count of switching occurrences. In other embodiments, a frequency over a given time period of operation of the SSD may be assessed. The buffer switch count may be a count accumulated during a fixed duration of SSD operation in such an embodiment. If the buffer switch count exceeds the reliability buffer switching threshold count, then the method may end. The reallocation of buffer from SLC Write Acceleration to TLC garbage collection is cancelled and the process ends. If the buffer switch count does not exceed the reliability buffer switching threshold count, then flow proceeds to block 625.

At block 625, the SSD dynamic optimization buffer switching system deallocates SLC buffer of the spare area and returns the buffer to the garbage collection process buffer. The buffer is switched to an TLC format for garbage collection. In some embodiments, the Write Acceleration is disabled. In other embodiments, some, but not all of the SLC buffer of the spare area is returned to the garbage collection process buffer. In such an embodiment, Write Acceleration may not be disabled, but instead reduced. The reallocated SLC buffer portion is added to the garbage collection buffer in an TLC format for added garbage collection buffer capacity.

Upon reallocating the SLC buffer to the garbage collection buffer, flow proceeds to 630. At 630, the buffer switch counter is incremented by one to account for the additional occurrence of buffer switching that has taken place. In some embodiments, if portions of the SLC buffer are reallocated, a buffer switch counter may be established for each portion and counts maintained for each portion of the spare area of the SSD that is subject to reallocation. At this point the process may end.

Figure 7:
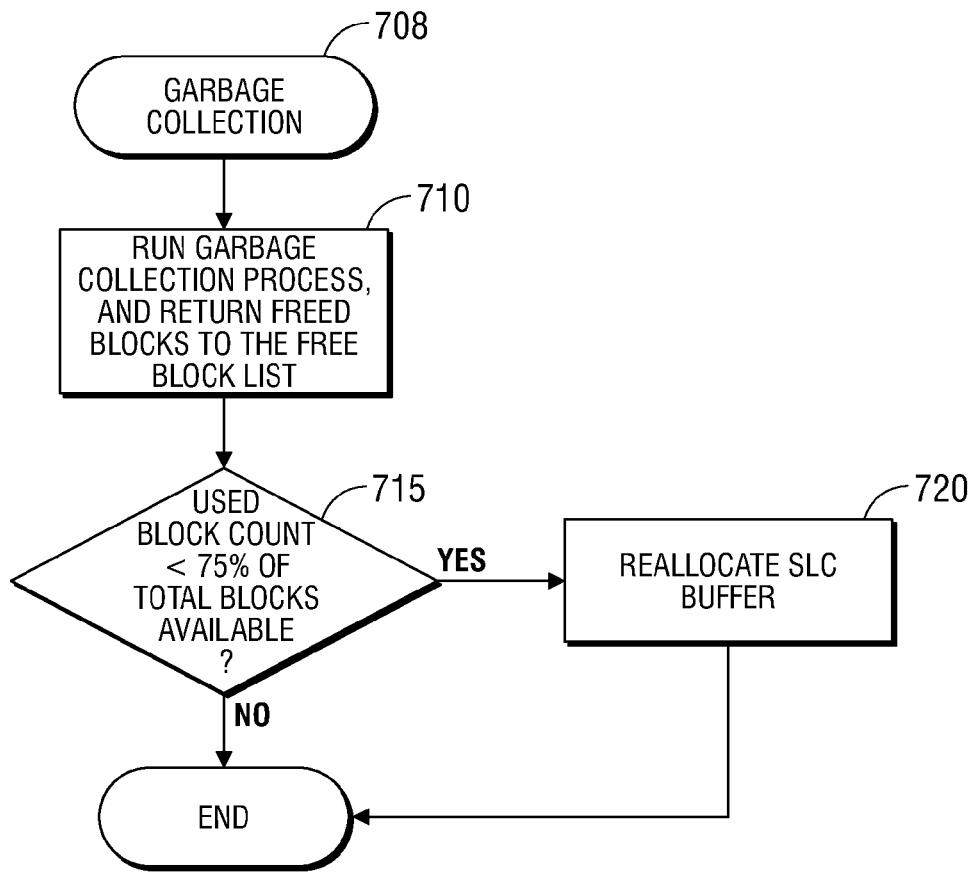
FIG. 7 is a flow diagram illustrating another method of operating the SSD dynamic optimization buffer switching system according to an embodiment of the present disclosure.

FIG. 7 is a flow chart showing operation of the SSD dynamic optimization buffer switching system according to another example embodiment. Flow begins at 705 where SSD controller initiates garbage collection to reclaim invalidated blocks. Proceeding to 710, the garbage collection process identifies blocks with invalidated data, rewrites remaining valid data in a block to a new location, and erases the invalidated block in accordance with garbage collection. Many garbage collection algorithms may be used to run the garbage collection process as described herein. Then the garbage collector returns freed blocks to a free block list and the memory map is noted as to availability of the blocks.

Proceeding to block 715, the SSD dynamic optimization buffer switching system determines if the used block count has fallen below a second SSD storage capacity utilization threshold level. The second SSD storage capacity utilization threshold level is set for return of the spare area buffer to SLC Write Acceleration when the capacity has fallen below a sufficient level. In the example embodiment of FIG. 7, the second SSD storage capacity utilization threshold level for reallocating the SLC buffer is set at 75% of the SSD total available block count. It is understood that the second reallocation SSD storage capacity utilization threshold level may be set at any level to avoid over switching between buffer formats by the SSD dynamic optimization buffer switching system in some aspects.

If after garbage collection the used block count has not fallen below the second reallocation SSD storage capacity utilization threshold level, the process may end and no reallocation of the buffer takes place. If however, the used block count does fall below the second reallocation SSD storage capacity utilization threshold level, the flow proceeds to block 720. At block 720, the SSD dynamic optimization buffer switching system reallocates a portion of the spare area from an TLC garbage collection buffer to an SLC buffer for use with Write Acceleration. Additionally, the SSD dynamic optimization buffer switching system may reactivate the Write Acceleration. As with previous examples, in some embodiments, only a portion of the SLC Write Acceleration buffer may have been reallocated to garbage collection and switched to TLC format. Upon falling below the second reallocation SSD storage capacity utilization threshold level, this portion of the SLC Write Acceleration buffer may be returned to SLC format and returned to Write Acceleration. In some additional embodiments, the SSD dynamic optimization buffer switching system may elect to activate a different portion of the SLC Write Acceleration buffer in the spare area for reallocation. For this latter embodiment, a different buffer switch counter may be used to track occurrences of buffer switching. At this point the process may end.

Figure 8:
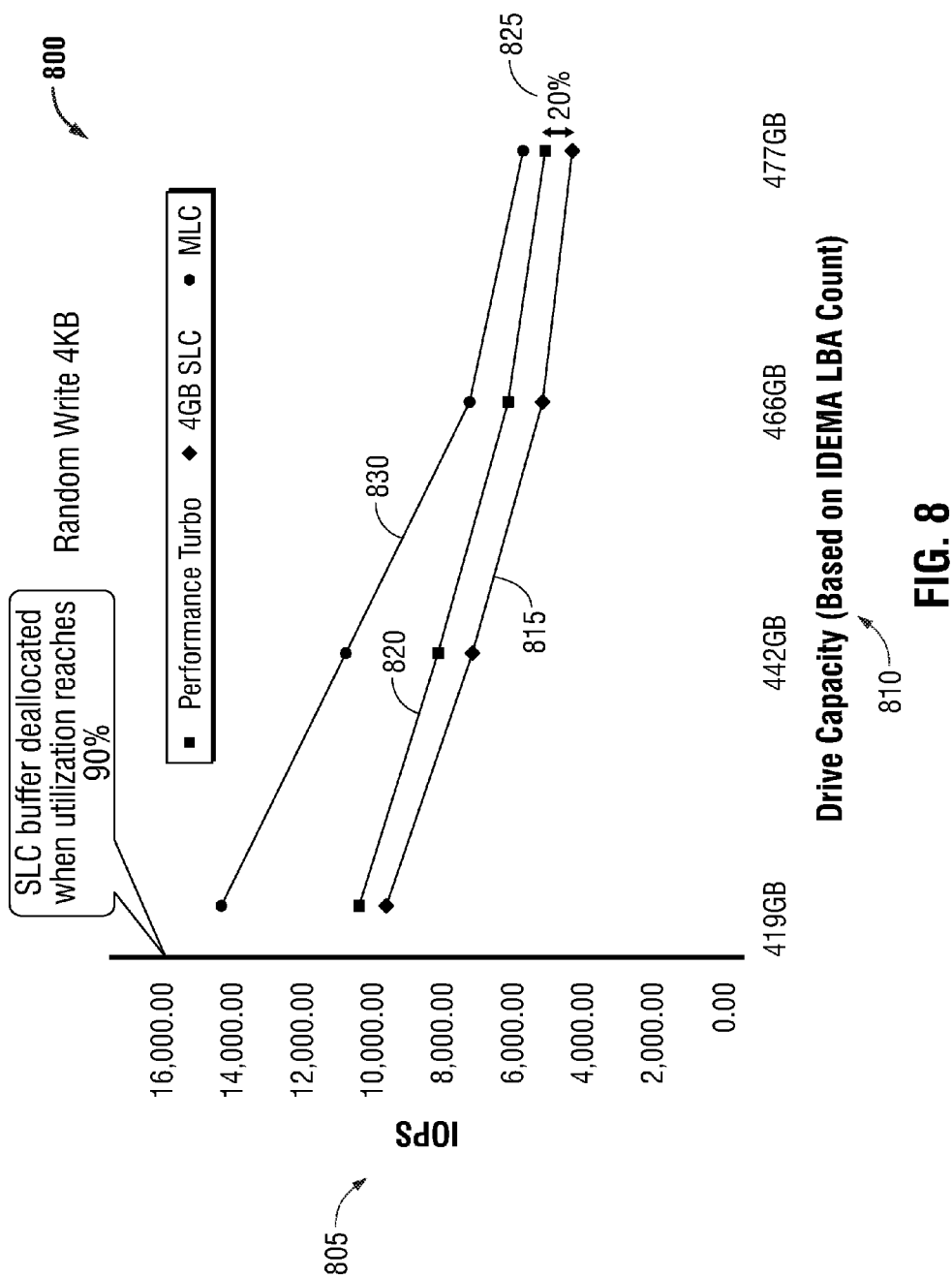
FIG. 8 is graphical chart illustrating the SSD dynamic optimization buffer switching system for various drive capacities according to an embodiment of the present disclosure.

FIG. 8 is a graphical chart showing the improvement in data throughput at high capacity utilization when a larger buffer is made available to the garbage collection process. The SSD dynamic optimization buffer switching system of the present disclosures enables Write Acceleration at low capacity utilization where a portion of the available buffer is used in SLC mode. This helps to boost data throughput on the TLC SSD to levels seen with MLC SSD. MLC SSD (2 bits per cell) has faster write and read operations than TLC SSD (three bits per cell). TLC SSD has higher density storage capabilities however. Thus, it is desirable to have higher density TLC SSD operate closer to MLC SSD throughput speeds but maintain density. Write Acceleration helps boost TLC SSD operation. As utilization goes up, Write Acceleration is disabled and the buffer is reallocated back to the garbage collection process in an embodiment, which helps to boost data throughput, boosting the performance of TLC SSD to levels nearer to MLC levels.

FIG. 8 shows a graphical chart having a throughput performance 805 on the left axis. In an embodiment, the throughput performance levels 805 are measured in I/O operations (TOPS). Additionally, drive capacity is shown on a y-axis 810. In an example embodiment, the drive capacity may be measured SSD total available blocks or via an IDEMA logical block address count. A benefit of the SSD dynamic optimization buffer switching system may be seen from the graphical chart of FIG. 8. At 815, throughput performance of the SSD is shown with a static SLC buffer and no Write Acceleration buffer reallocation. In the example embodiment, the static SLC may be 4 GB of SLC allocated for write acceleration. At 820, overall throughput performance is shown when the SLC buffer is deactivated upon utilization of the SSD capacity exceeding 90%. As depicted at 825, a 20% improvement in throughput may be achieved. This 20% improvement is shown to be closer to the desirable throughput levels of MLC SSD as shown at 830.

While embodiments have been described herein with respect to specific types SSD controller activity and performance, other embodiments may be applied and include additional SSD controller activity relating to SSD read or write operation enhancements and function of the SSD to avoid failures in SSD cells or data. For example, if it is desirable to provide other or additional types of SSD function enhancements or buffering, an embodiment using such other or additional types of function enhancements or buffering may be implemented in accordance with the disclosure herein. In the methods described herein a flow of method steps is depicted, however it is understood that one or more of the steps may be formed in any order and some steps may be performed simultaneously. It is also understood that in some embodiments not all steps may be performed or additional steps may be added as understood by those of skill in the art. Finally, it is understood that one or more steps from each of the method embodiments disclosed may be combined in various ways to provide combination embodiments.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such central processor units or other processors provided by companies such as Intel®, AMD®, ARM® and others such that the software and firmware are capable of operating a relevant environment of the information handling system. Other processors, controllers, or other such devices may also have embedded firmware or software capable of operating a relevant environment of an information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
 a solid state drive (SSD) memory device;
 an SSD controller executing instructions of an SSD dynamic optimization buffer switching system;
 the SSD controller detecting SSD storage capacity utilization; and
 the SSD controller reallocating buffer capacity from write acceleration buffer capacity to garbage collection buffer capacity to increase buffer availability for garbage collection when SSD storage capacity utilization exceeds a threshold level.

2. The information handling system of claim 1 wherein reallocating buffer capacity switches from a single level cell (SLC) NAND buffer for write acceleration to a triple-level cell (TLC) NAND buffer for additional garbage collection buffer capacity.

3. The information handling system of claim 1 wherein the SSD storage capacity utilization threshold level is a used block count set at a level of 65% or greater of a total available block count for the SSD memory device.

4. The information handling system of claim 1 further comprising:
 the SSD controller increasing a count for an incremental buffer switch counter for each buffer capacity reallocation.

5. The information handling system of claim 4 further comprising:
 the SSD controller determining that the count of the incremental buffer switch counter is below a reliability buffer switching threshold count; and
 the SSD controller proceeding to switch from a single level cell (SLC) NAND buffer capacity for write acceleration to a triple-level cell (TLC) NAND buffer capacity for additional garbage collection buffer capacity.

6. The information handling system of claim 4 further comprising:
 the SSD controller determining that the count of the incremental buffer switch counter is below the buffer switching threshold count; and
 the SSD controller cancelling buffer capacity reallocation.

7. The information handling system of claim 1 further comprising:
 the SSD controller running a garbage collection algorithm to return freed blocks to a freed block list.

8. The information handling system of claim 7 further comprising:
 the SSD controller detecting SSD storage capacity utilization after garbage collection; and
 the SSD controller reallocating buffer capacity from garbage collection buffer capacity to write acceleration buffer capacity to increase buffer availability for write acceleration when SSD storage capacity utilization falls below a second SSD storage capacity utilization threshold level.

9. A computerized method of solid state drive (SSD) dynamic optimization comprising:
 executing instructions, via an SSD controller, of an SSD dynamic optimization buffer switching system;
 detecting SSD storage capacity utilization via the SSD controller; and
 reallocating buffer capacity from write acceleration buffer capacity to garbage collection buffer capacity to increase buffer availability for garbage collection when SSD storage capacity utilization exceeds a threshold level.

10. The computerized method of claim 9 wherein reallocating buffer capacity switches from a single level cell (SLC) NAND buffer for write acceleration to a triple-level cell (TLC) NAND buffer for additional garbage collection buffer capacity.

11. The computerized method of claim 9 wherein the SSD storage capacity utilization threshold level is a used block count of 90%+/−5% of a total available block count for the SSD memory device.

12. The computerized method of claim 9 further comprising:
increasing a count for an incremental buffer switch counter for each buffer capacity reallocation.

13. The computerized method of claim 12 further comprising:
determining, via the SSD controller, that the count of the incremental buffer switch counter is below a reliability buffer switching threshold count; and
permitting a switch from a single level cell (SLC) NAND buffer capacity for write acceleration to a triple-level cell (TLC) NAND buffer capacity for additional garbage collection buffer capacity.

14. The computerized method of claim 12 further comprising:
determining, via the SSD controller, that the count of the incremental buffer switch counter is below the buffer switching threshold count; and
cancelling buffer capacity reallocation.

15. The information handling system of claim 9 further comprising:
detecting SSD storage capacity utilization after a garbage collection algorithm is executed; and
reallocating buffer capacity from garbage collection buffer capacity to write acceleration buffer capacity to increase buffer availability for write acceleration when SSD storage capacity utilization falls below a second SSD storage capacity utilization threshold level.

16. The computerized method of claim 15 wherein the second SSD storage capacity utilization threshold level is a used block count of 75%+/−5% of an IDEMA logical block addressing count.

17. An information handling system comprising:
a solid state drive (SSD) memory device;
an SSD controller executing instructions of an SSD dynamic optimization buffer switching system;
the SSD controller running a garbage collection algorithm to return freed SSD storage blocks to a freed block list;
the SSD controller detecting SSD storage capacity utilization; and
the SSD controller reallocating reallocates a portion of a buffer capacity from write acceleration buffer capacity to a garbage collection buffer capacity to increase buffer availability for garbage collection when SSD storage capacity utilization exceeds a threshold level.

18. The information handling system of claim 17 further comprising:
the SSD dynamic optimization buffer switching system halting write acceleration when all write acceleration buffer capacity has been reallocated to the garbage collection buffer.

19. The information handling system of claim 17 wherein reallocating buffer capacity switches from a single level cell (SLC) NAND buffer for write acceleration to a triple-level cell (TLC) NAND buffer for additional garbage collection buffer capacity.

20. The information handling system of claim 17 wherein the SSD controller reallocates a portion of the buffer capacity from write acceleration buffer capacity to the garbage collection buffer capacity to increase buffer availability for garbage collection when SSD storage capacity utilization exceeds a threshold level.

* * * * *